(12) United States Patent
Mantegna

(10) Patent No.: US 6,500,775 B1
(45) Date of Patent: Dec. 31, 2002

(54) TEXTILE FILM LAMINATION

(75) Inventor: Douglas Mantegna, 429 MacDonald Road, Oakville, Ontario (CA), L6H 2B5

(73) Assignee: Douglas Mantegna, Oakville (CA)

( * ) Notice: Subject to any disclaimer, the term of this patent is extended or adjusted under 35 U.S.C. 154(b) by 0 days.

(21) Appl. No.: 09/430,025

(22) Filed: Oct. 29, 1999

(30) Foreign Application Priority Data

Nov. 18, 1998 (CA) .............................................. 2254415

(51) Int. Cl.[7] .............................................. B32B 27/12
(52) U.S. Cl. ..................... 442/149; 442/150; 442/151; 442/286; 442/288; 428/335; 428/336; 428/343; 428/920; 428/921
(58) Field of Search ................................ 428/920, 921, 428/335, 336, 343; 442/149, 150, 151, 286, 288

(56) References Cited

U.S. PATENT DOCUMENTS

| | | | | |
|---|---|---|---|---|
| 4,349,593 A | * | 9/1982 | Blechstein ................... | 428/40 |
| 4,693,926 A | * | 9/1987 | Kowalski et al. ............ | 428/204 |
| 4,780,359 A | * | 10/1988 | Trask et al. .................. | 428/234 |
| 4,994,317 A | * | 2/1991 | Dugan et al. ................ | 428/246 |
| 5,942,330 A | * | 8/1999 | Kelley ....................... | 428/423.1 |
| 5,976,671 A | * | 11/1999 | Gleim ......................... | 428/172 |
| 6,265,082 B1 | * | 7/2001 | Dunham et al. ............ | 442/288 |

* cited by examiner

Primary Examiner—Elizabeth M. Cole
Assistant Examiner—Jeremy R. Pierce
(74) Attorney, Agent, or Firm—James W. Carson

(57) ABSTRACT

The present invention relates to provided a textile film lamination for use as a wall covering and the like, comprising a fabric layer formed of fire retardant yarn filaments and having a face and back side, a thermoplastic cap film applied to the face of the fabric under heat and pressure, a fire retardant thermosetting or thermoplastic film adhesive on the back of the fabric wherein the fabric retains its fabric-like quality in appearance and tactile feel. The invention retains a weave like look and feel to the fabric while providing a protective clear film on the face surface of the fabric. The invention is suitable for use on wall surfaces in aircraft interiors, rail coach cars, buses, ships, hospitals, public office buildings, sports arenas, hotels, theaters, churches, seniors homes and schools where flammability of the covering material is crucial.

12 Claims, 1 Drawing Sheet

TEXTILE FILM LAMINATION

BACKGROUND OF THE INVENTION

1. Field of the Invention

This invention relates to a fire retardant, high performance fabric lamination for use in high traffic wall covering areas. In particular the present invention provides wall coverings on vertical surface walls within aircraft cabin interiors and other venues where flammability of wall covering material is crucial.

2. Description of the Prior Art

The use of woven and non-woven fabric as a substrate which is supported by plastic laminating materials consisting of resins that encase the fabric and provide smooth plastic like surfaces is known. However the face side of the fabric does not retain its textural characteristics. Webs of reinforcing strands have also been encased in resins to give support to a laminated plastic sheet (see U.S. Pat. Nos. 3,616,130 and 5,773,373).

It is also known to prepare fire retardant material by encapsulating a core fibre in a wrapping or covering to form a heat resistant yarn which may be woven into a heat resistant fabric (see U.S. Pat. No. 4,500,593).

U.S. Pat. No. 4,246,311 is directed to a fire-retardant barrier fabric comprising a polyvinyl/polyvinylidene film including fire retardant material laminated to a scrim woven from high density polyethylene sandwiched between two layers of low density polyethylene material containing fire retardant material.

The known structures do not retain the fabric like quality in appearance and tactual feel while at the same time providing protection for the surface of the fabric for cleaning purposes and giving the fabric added structural support and fire retardation properties.

SUMMARY OF THE INVENTION

It is an object of the invention to protect the surface of a fabric, suitable for use as a wall covering and the like and having fire retardant properties, while retaining its fabric like quality in appearance and its tactile feel.

It is a further object of the invention to retain a weave like look and feel to fabric while providing a protective clear film on the face surface of the fabric.

It is a still further object of the invention to provide a fire retardant wall covering fabric suitable for use on wall surfaces in aircraft interiors, rail coach cars, bus ships, hospitals, public office buildings, sports arenas, hotels, theaters, churches, seniors homes and schools where flammability of wall covering material is crucial.

Thus in accordance with the present invention there is provided a textile film lamination for use as a wall covering or the like, comprising a fabric layer formed of fire retardant yarn filaments and having a face and back side, a thermoplastic cap film applied to the face of the fabric under heat and pressure, a fire retardant thermosetting or thermoplastic film adhesive on the back of the fabric wherein the fabric retains its fabric-like quality in appearance and tactile feel. The invention retains a weave like look and feel to the fabric while providing a protective clear film on the face surface of the fabric.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

Figure 1:
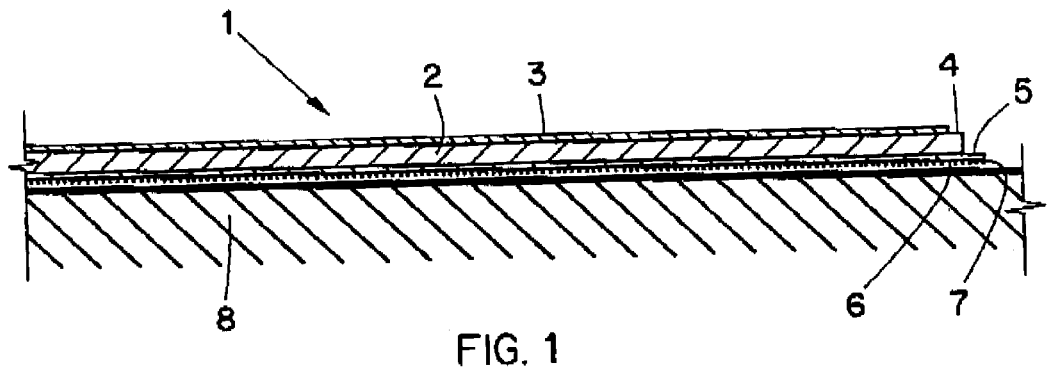
FIG. 1 is a cross-sectional view of a textile film lamination according to the present invention applied to a substrate (wall).

Referring to FIG. 1, a textile film lamination according to the present invention is generally indicated at 1. The lamination 1 consists of fire-retardant fabric 2 layered with a clear PVF or PVDF cap film 3 with a preferred thickness of 0.5–3 mils on the face 4 of the fabric. A fire retardant film adhesive layer 5 is placed on the back 6 of the fabric 2. A pressure sensitive adhesive layer 7 with release paper (not shown) is placed on the adhesive layer 5.

In the preferred embodiment, Nomex™ filament and spun yarns are woven into a fabric in a sateen weave construction. While a sateen weave construction is used in the preferred embodiment the woven fabric may have various pattern constructions including Rep, Plain, Twill, Basket and Jacquard and Dobby. Other known fire resistant fibers which may be used in this type of lamination are in the fiber classification known as aramid. These may include Kernel™, Kevlar™, PBI (polybenzimidazole) and Connex™. Additionally chemically treated fire retardant fabric made of wool, nylon/wool blends and fire retardant (FR) polyester; fiber materials made from PEEK under the trade name Zytex™ fibers; fiberglass and carbon fibers or a polyimide fiber that exhibits thermally stable fibers and produces a zero heat release polymer (polybenzoxazole) may be used for fabric 2. A combination of woven or knitted constructions with flame resistant fibers and yarns may also be utilized.

In order to construct the textile film lamination of the present invention, the fabric 2 is first treated with a fire resistant acrylic resin finish to give body and stiffness to the fabric and cured at a temperature of 350° F. to 400° F. The fabric 2 is then prepared for either press lay ups or continuous lamination operations. The fabric is either cut to lengths to fit in the laminating press or put up in continuous rolls.

A clear Tedlar™ PVF (polyvinyl fluoride) or Kynar™ PVDF (polyvinylidene fluoride) thermoplastic cap film 3 with a thickness range of 0.5–3 mils is placed on the face 4 of the fabric 2. On the back 6 of the fabric a fire retardant thermosetting or thermoplastic film adhesive 5 is placed. This film adhesive 5, under temperature and pressure, will penetrate into the backside of the fabric 2, giving it further as rigidity and prevents the yarns from shifting. This entire composite, (cap film 3, fabric 2 and film adhesive 5), is then subject to a temperature of 220° F. to 340° F. at 50 to 100 psi. Under heat and with pressure, the clear cap film 3 flows over and around the woven structure of the fabric 2 so as to give a plastic coating to the yarns. This film is extremely durable to abrasion, resistant to chemical solvents and can be easily wiped clean.

Prior to the lamination of the thermoplastic cap film 3 on the face 4 of fabric 2, a sheet of clear or coloured Tedlar™ PVP or Kynar™ PVDF film which has a printed decorative pattern or image, may be sandwiched between the fabric face 4 and the cap film 3. This additional decorative element gives the woven fabric considerable visual appeal and added value while still retaining the textural element of the laminations without having to change the weave configuration.

The composite is cooled down. A dual sided pressure sensitive adhesive 7 (PSA) with a release paper may be applied to the back side 6 of the fabric. The release paper is then removed when the composite is ready to be applied to a substrate 8 such as a walled surface.

This textile film lamination of the present invention has wide application for use on wall surfaces in the transportation market such as aircraft interiors, rail coach cars, bus and shipboard where flammability of wall covering material is crucial. The textile film lamination may be vacuum formed for example as a side wall panel around windows or other openings in aircraft etc. The present invention can be used as a covering for other structural components including side panels on chairs, desks, office partitions etc. The textile film lamination of the present invention meets the current OSU Heat Release F.A.A. 25.853 (d) Appendix F, Part IV and Smoke Density F.A.A. 25.853 (d) Appendix F, Part V. Other areas of application where the product is suitable may be hospitals, public office buildings, sports arenas, hotels, theaters, churches, seniors homes and schools.

Having illustrated and described a preferred embodiment of the invention and certain possible modifications thereto, it should be apparent to those of ordinary skill in the art that the invention permits of further modification in arrangement and detail. All such modifications are covered by the scope of the invention.

The embodiments of the invention in which an exclusive property or privilege is claimed are defined as follows:

1. A textile film lamination for use as a wall covering comprising a fabric layer consisting of fire retardant yarn filaments having a woven or knitted construction and having a face and back side, a thermoplastic cap film applied to the face side of the fabric layer under heat and pressure, said thermoplastic cap film having a top surface and a bottom surface, a fire retardant thermosetting or thermoplastic film adhesive layer on the back side of the fabric layer wherein the top surface of the thermoplastic cap film retains the woven or knitted texture of the face side of the fabric layer.

2. A textile film lamination according to claim 1 wherein a pressure sensitive adhesive layer with release paper is placed on the film adhesive layer.

3. A textile film lamination according to claim 1 wherein said fire retardant yarn filaments are selected from the group consisting of aramide filaments, aramids, chemically treated fire retardant wool, nylon/wool blends and fire retardant (FR) polyester; fiber materials made from polyetherether ketone, fiberglass fibers, carbon fibers and polyimide fibers.

4. A textile film lamination according to claim 3 wherein the fire retardant yarn filaments are an aramid.

5. A textile film lamination according to claim 3 wherein the fire retardant yarn filaments are polyetherether ketone fibers.

6. A textile film lotion according to claim 1 wherein the thermoplastic cap film is a polyvinyl fluoride or polyvinylidene fluoride film.

7. A textile film lamination according to claim 6 wherein the thermoplastic cap film has a thickness of 0.5–3 mils.

8. A textile film lamination according to claim 1 wherein the thermoplastic cap film is a clear film.

9. A textile film lamination according to claim 8 wherein a clear or coloured film layer is laminated between the face side of the fabric layer and the bottom surface of the thermoplastic cap film.

10. A textile film lamination according to claim 9 wherein the clear or coloured film layer is printed with a decorative pattern or image.

11. A textile film lamination according to claim 10, wherein the clear or coloured film layer is a polyvinyl fluoride or polyvinylidene fluoride film.

12. A textile film lamination according to claim 3 wherein said film lamination meets flammability, heat release, and smoke emission standards prescribed by FAA regulation 25.853.

* * * * *